United States Patent [19]

Gellert

[11] Patent Number: 5,312,242
[45] Date of Patent: May 17, 1994

[54] INJECTION MOLDING NOZZLE WITH THERMOCOUPLE TUBE

[76] Inventor: Jobst U. Gellert, 7A Prince St., Georgetown, Ontario, Canada, L7G 2X1

[21] Appl. No.: 25,123

[22] Filed: Mar. 2, 1993

[51] Int. Cl.⁵ .............................................. B29C 45/20
[52] U.S. Cl. ................... 425/549; 264/328.15; 425/570
[58] Field of Search ................ 425/549, 568, 570; 264/328.15

[56] References Cited

U.S. PATENT DOCUMENTS

| | | | |
|---|---|---|---|
| 4,583,284 | 4/1986 | Gellert | 29/611 |
| 4,586,887 | 5/1986 | Gellert | 425/549 |
| 4,705,473 | 11/1987 | Schmidt | 425/549 |
| 4,768,283 | 9/1988 | Gellert | 425/549 |

*Primary Examiner*—Tim Heitbrink
*Attorney, Agent, or Firm*—Dalesman & Company

[57] ABSTRACT

A heated injection molding nozzle having a cylindrical locating flange extending forwardly from a rear collar portion to mount the nozzle in a well in a cooled mold. The nozzle has a cylindrical central portion with an insulative air space extending between it and the surrounding cooled mold. A hollow thermocouple tube extends through the rear collar portion and along the inner surface of the locating flange to removably receive a thermocouple element which extends from the rear end of the nozzle and through the insulative air space to monitor the operating temperature near the forward end of the nozzle. In the event of pressurized melt escaping to fill the air space, contact of the thermocouple tube with the locating flange cools the melt which flows into the thermocouple tube sufficiently to freeze it and prevent leakage out amongst the wiring in other parts of the mold.

6 Claims, 2 Drawing Sheets

INJECTION MOLDING NOZZLE WITH THERMOCOUPLE TUBE

BACKGROUND OF THE INVENTION

This invention relates generally to injection molding and more particularly to a heated nozzle having a tube for removably receiving a thermocouple element extending along the inner surface of a cylindrical locating flange where it is spaced from the outer surface of the central portion of the nozzle.

Mounting a heated injection molding nozzle in a well in a cooled mold with an insulative air space between them is well known. It is also known to run a thermocouple element through the air space to monitor the operating temperature near the forward end of the nozzle. An example of this is shown in the applicant's U.S. Pat. No. 4,583,284 which issued Apr. 22, 1986 where the thermocouple element extends into the insulative air space through an opening in the mold. Another example is seen in the applicant's U.S. Pat. No. 4,768,283 which issued Sep. 6, 1988 where the thermocouple element extends into the insulative air space through a thermocouple bore extending forwardly through the rear collar portion of the nozzle. While these previous configurations are usually satisfactory, they have the danger that in the event of a leak of pressured melt into the air space, the melt will flow out of the air space along the thermocouple element and fill the electrical wire channels in the mold. The resulting plastic spread throughout the mold is very difficult to remove when the mold has to be disassembled.

U.S. Pat. No. 4,705,473 to Schmidt which issued Nov. 10, 1987 shows an arrangement which avoids this problem by extending the thermocouple bore entirely through the nozzle and not entering the insulative air space around it. However, this configuration has the disadvantage that it is more difficult to make and is not possible when the nozzle diameter is reduced to produce compact nozzles.

SUMMARY OF THE INVENTION

Accordingly, it is an object of the present invention to at least partially overcome the disadvantages of the prior art by providing a heated nozzle with a thermocouple tube which prevents the leakage of melt along the thermocouple element.

To this end, in one of its aspects, the invention provides an injection molding nozzle to be mounted in a well in a cooled mold, the nozzle having a rear end, a forward end, a rear collar portion adjacent to the rear end, and a central portion extending forwardly from the rear collar portion, the central portion having a generally cylindrical outer surface and the rear collar portion being larger in diameter than the central portion, the nozzle having a melt channel extending therethrough to convey melt from an inlet at the rear end towards at least one gate extending through the mold to a cavity, the nozzle having an integral electrical heating element with a spiral portion extending around at least a portion of the melt channel, the nozzle having a cylindrical locating flange extending a predetermined distance forwardly from the rear collar portion around the central portion, the locating flange having an inner surface spaced from the outer surface of the central portion by an insulative space having a predetermined width, the rear collar portion of the nozzle having a thermocouple bore extending therethrough from the rear end to the insulative space between the central portion and the locating flange, having the improvement wherein the nozzle comprises a hollow thermocouple tube extending from the thermocouple bore in contact with the locating flange to removably receive a thermocouple element extending into the insulative space, the thermocouple tube being spaced a predetermined distance from the outer surface of the central portion of the nozzle.

Further objects and advantages of the invention will appear from the following description taken together with the accompanying drawings.

DETAILED DESCRIPTION OF THE DRAWINGS

Figure 1:
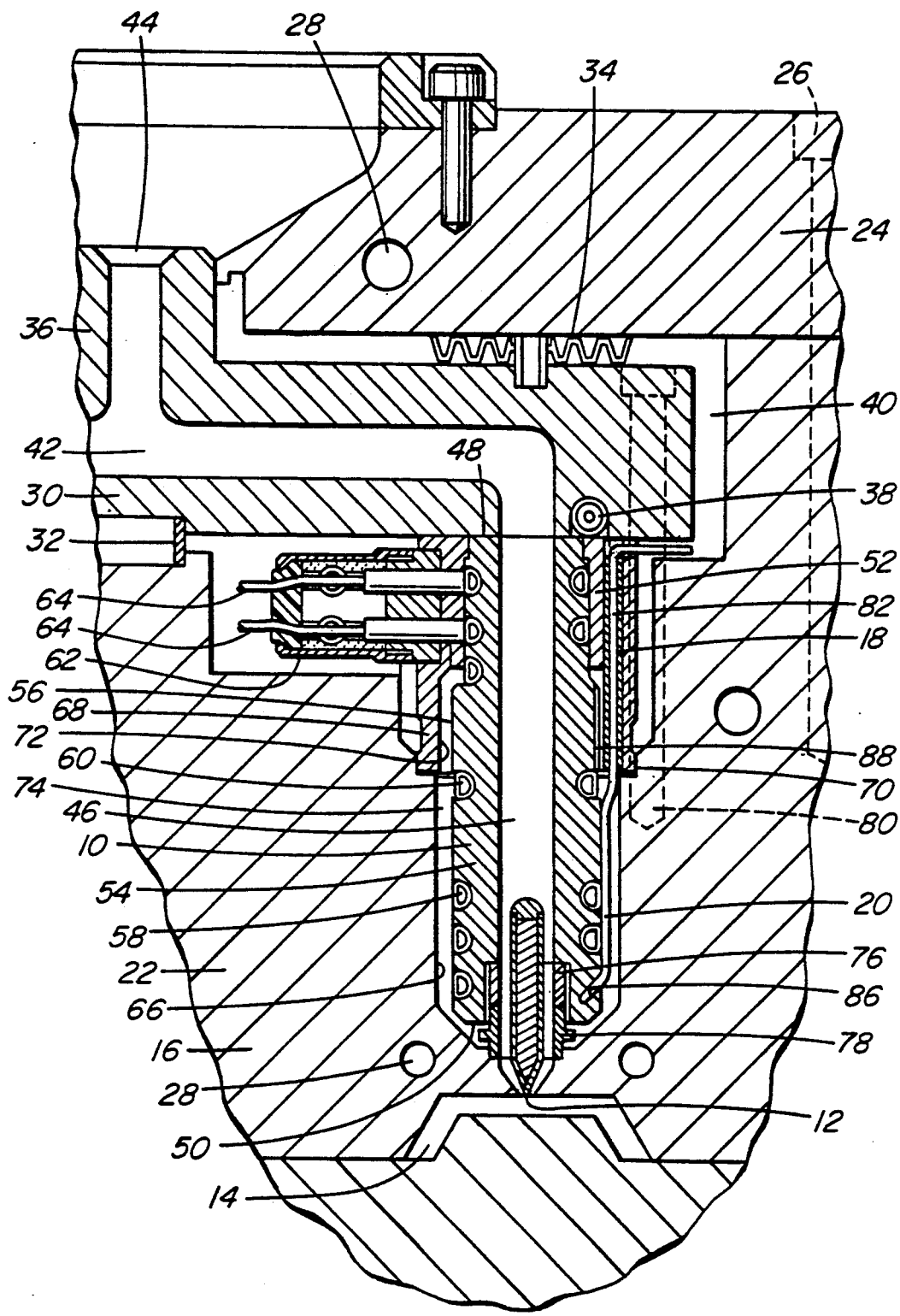
FIG. 1 is a sectional view of a portion of a multi-cavity injection molding system showing a nozzle according to a preferred embodiment of the invention.

Reference is first made to FIG. 1 which shows a portion of a multi-cavity injection molding system having several steel nozzles 10 to convey pressurized plastic melt to respective gates 12 leading to different cavities 14 in the mold 16. Each nozzle 10 has a thermocouple tube 18 through which a thermocouple element 20 extends according to the invention. In this particular configuration, the mold includes a cavity plate 22, and a back plate 24 which are removably secured together by bolts 26. The mold 16 is cooled by pumping cooling water through cooling conduits 28 extending in the cavity plate 22, and the back plate 24. An electrically heated steel melt distribution manifold 30 is mounted between the cavity plate 22 and the back plate 24 by a central locating ring 32 and insulative and resilient spacer members 34. The melt distribution manifold 30 has a cylindrical inlet portion 36 and is heated by an integral electrical heating element 38. An insulative air space 40 is provided between the heated manifold 30 and the surrounding cooled cavity plate 22, and back plate 24. A melt passage 42 extends from a common inlet 44 in the inlet portion 36 of the manifold 30 and branches outward in the manifold 30 to each nozzle 10 where it extends through a central melt channel 46 to one of the gates 12.

Each nozzle 10 has a rear end 48, a forward end 50, a rear collar portion 52 adjacent the rear end 48, and a central portion 54 which extends forwardly from the rear collar portion 52. The central portion 54 has a generally cylindrical outer surface 56, and the rear collar portion 52 is larger in diameter than the central portion 54. The nozzle 10 is heated by an integral electrical heating element 58 which has a spiral portion 60 extending around the melt channel 46 and an external terminal 62 to which electrical leads 64 from a power source are connected. The nozzle 10 is seated in a well 66 in the cavity plate 22 with a cylindrical locating flange 68 extending a predetermined distance forwardly from the collar portion 52 to a circular locating shoulder 70 in the well 66. The locating flange 68 has an inner surface 72 which is spaced from the outer surface 56 of the central portion 54 by an insulative air space 74 which also extends between the heated central portion 54 of the nozzle 10 and the surrounding cooled cavity plate 22.

In this configuration, the melt channel 46 extends centrally from the rear end 48 to a torpedo 76 which is seated in the forward end 50 in alignment with one of the gates 12. A hollow nozzle seal 78 is seated in the cavity plate 22 around the gate 12 to retain the torpedo 76 in place and prevent melt leaking into the air space 74. Of course, nozzles 10 to provide other types of gating will have different configurations. The melt distribution manifold 30 and the nozzles 10 are securely retained in this position against the melt injection pressure by the space members 34 and also by bolts 80 which extend from the manifold 30 into the cavity plate 22.

The nozzle 10 has a thermocouple bore 82 which extends through the rear collar portion 52 from the rear end 48 to the insulative air space 74 between the central portion 54 and the locating flange 68. In this embodiment, the hollow thermocouple tube 18 which is made of stainless steel extends through the thermocouple bore 82 in the collar portion 52 and along the inner surface 72 of the locating flange 68. In an alternate embodiment, the thermocouple tube 18 can be mounted along the inner surface 72 of the locating flange 68 to extend directly from the thermocouple bore 82 in the collar portion 52 so that any melt which escapes into the air space 74 cannot leak between them.

Figure 2:
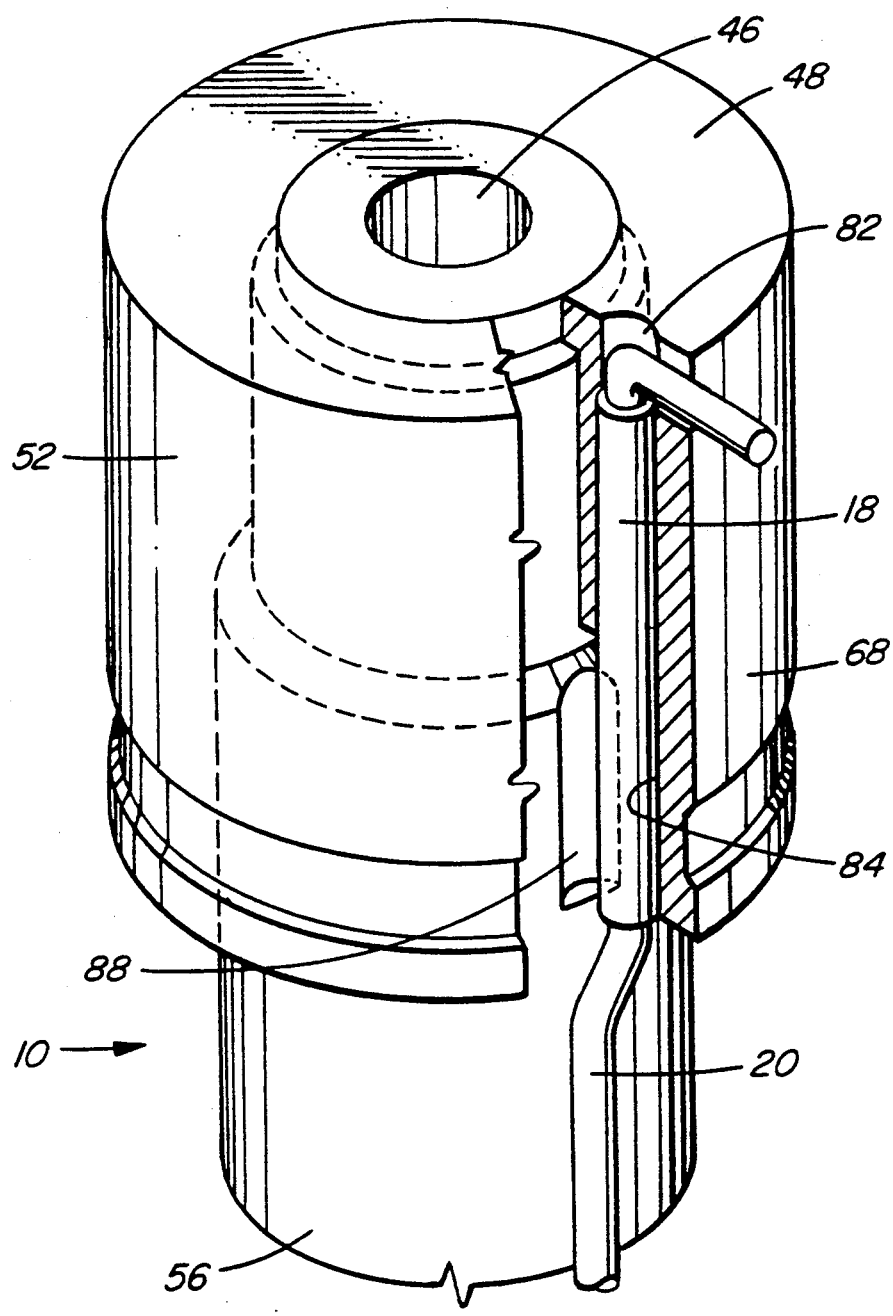
FIG. 2 is a cut-away isometric view of a portion of the nozzle seen in FIG. 1 showing the clearance between the thermocouple tube and the central portion of the nozzle.

As best seen in FIG. 2, in this embodiment the thermocouple tube 18 is partially seated in a groove 84 in the inner surface 72 of the locating flange 68. A nickel alloy brazing material is applied along it, and it is integrally brazed in place in a vacuum furnace at the same time as the other components of the nozzle are integrally brazed together. The thermocouple tube 18 removably receives the thermocouple element 20 which then runs through the air space 74 and into a suitable bore 86 to monitor the operating temperature near the forward end 50 of the nozzle 10.

As will be appreciated, the relatively thin locating flange 68 is to some extent cooled by contact with the cooled cavity plate 22 against which it is located and seated. In the event of a leak of pressurized melt into the air space 74 around the central portion 54 of the nozzle, the contact of the thermocouple tube 18 with the locating flange 68 cools the melt which flows into the thermocouple tube 18 around the thermocouple element 20 sufficiently to freeze it and prevent leakage through the thermocouple tube 18. In this embodiment, as clearly seen in FIG. 2, the outer surface 56 of the central portion 54 of the nozzle 10 is depressed adjacent the thermocouple tube 18 by having a channel 88 which extends in alignment with the thermocouple tube 18. This provides additional clearance between the thermocouple tube 18 and the central portion 54 of the nozzle 10 to avoid heat from the heated central portion 54 overcoming the cooling effect on the thermocouple tube 18 from the locating flange 68.

In use, the injection molding system is assembled as shown in FIG. 1. While only a single cavity 14 has been shown for ease of illustration, it will be appreciated that the melt distribution manifold 30 normally has many more melt passage branches extending to numerous cavities 14 depending on the application. Electrical power is applied to the heating element 38 in the manifold 30 and to the heating elements 58 in the nozzles 10 to heat them to a predetermined operating temperature. Pressurized melt from a molding machine (not shown) is then injected into the melt passage 42 through the common inlet 44 according to a predetermined cycle in a conventional manner. The pressurized melt flows through the melt channels 46 of the respective nozzles 10 to the gates 12 to fill the cavities 14. After the cavities 14 are filled, injection pressure is held momentarily to pack and then released. After a short cooling period, the mold is opened to eject the molded products. After ejection, the mold is closed and injection pressure is reapplied to refill the cavities 14. This cycle is continuously repeated with a frequency dependent on the size and shape of the cavities 14 and the type of material being molded. If the pressurized melt leaks past the nozzle seal 78 and fills the air space 74, it flows into the thermocouple tube 18 around the thermocouple element 20. However, the contact of the thermocouple tube 18 with the locating flange 68 cools the thermocouple tube 18 sufficiently to freeze the melt in the tube and prevent it escaping amongst the wiring in other parts of the mold.

While the description of the nozzle has been given with respect to a preferred embodiment, it will be evident that various modifications are possible without departing from the scope of the invention as understood by those skilled in the art and as defined in the following claims.

The embodiments of the invention in which an exclusive property or privilege is claimed are defined as follows:

1. In an injection molding nozzle to be mounted in a well in a cooled mold, the nozzle having a rear end, a forward end, a rear collar portion adjacent the rear end, and a central portion extending forwardly from the rear collar portion, the central portion having a generally cylindrical outer surface and the rear collar portion being larger in diameter than the central portion, the nozzle having a melt channel extending therethrough to convey melt from an inlet at the rear end towards at least one gate extending through the mold to a cavity, the nozzle having an integral electrical heating element with a spiral portion extending around at least a portion of the melt channel, the nozzle having a cylindrical locating flange extending a predetermined distance forwardly from the rear collar portion around the central portion, the locating flange having an inner surface spaced from the outer surface of the central portion by an insulative space having a predetermined width, the rear collar portion of the nozzle having a thermocouple bore extending therethrough from the rear end to the insulative space between the central portion and the locating flange, having the improvement wherein;

the nozzle comprises a hollow thermocouple tube extending from the thermocouple bore a predetermined distance forwardly along the inner surface of the locating flange to removably receive a thermocouple element extending into the insulative space, the thermocouple tube being spaced a predetermined distance from the outer surface of the central portion of the nozzle whereby in the event of a leak of pressurized melt into the insulative space around the central portion of the nozzle, the contact of the hollow thermocouple tube with the locating flange cools the melt which flows into the thermocouple tube around the thermocouple element sufficiently to freeze said melt and prevent leakage through the thermocouple tube.

2. An injection molding nozzle as claimed in claim 1 wherein the thermocouple tube also extends through the thermocouple bore through the rear collar portion of the nozzle.

3. An injection molding nozzle as claimed in claim 2 wherein the thermocouple tube is at least partially seated in a groove in the inner surface of the locating flange of the nozzle.

4. An injection molding nozzle as claimed in claim 3 wherein the thermocouple tube is integrally brazed in pg,17 place.

5. An injection molding nozzle as claimed in claim 4 wherein the outer surface of the central portion is depressed adjacent the thermocouple tube to provide sufficient clearance therebetween.

6. An injection molding nozzle as claimed in claim 4 wherein the outer surface of the central portion has a channel extending in alignment with the thermocouple tube to provide sufficient clearance therebetween.

* * * * *